United States Patent
Macias et al.

(10) Patent No.: US 9,743,316 B2
(45) Date of Patent: Aug. 22, 2017

(54) DYNAMIC CARRIER LOAD BALANCING

(71) Applicant: Verizon Patent and Licensing Inc., Arlington, VA (US)

(72) Inventors: John F. Macias, Antelope, CA (US); Deepak Kakadia, Antioch, CA (US); Kent W. Hughes, Oakland, CA (US); Lalit R. Kotecha, San Ramon, CA (US); Maria G. Lam, Oakland, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 340 days.

(21) Appl. No.: 14/453,577

(22) Filed: Aug. 6, 2014

(65) Prior Publication Data
US 2016/0044537 A1 Feb. 11, 2016

(51) Int. Cl.
*H04W 28/08* (2009.01)
*H04W 48/12* (2009.01)
*H04W 72/04* (2009.01)
*H04W 72/06* (2009.01)

(52) U.S. Cl.
CPC ........... *H04W 28/08* (2013.01); *H04W 48/12* (2013.01); *H04W 72/042* (2013.01); *H04W 72/06* (2013.01)

(58) Field of Classification Search
CPC .... H04W 48/12; H04W 28/08; H04W 72/042
See application file for complete search history.

(56) References Cited

U.S. PATENT DOCUMENTS

| | | | |
|---|---|---|---|
| 9,226,210 B1 * | 12/2015 | Saleh | H04W 36/22 |
| 2002/0178262 A1 * | 11/2002 | Bonnell | G06F 9/5083 709/225 |
| 2009/0270104 A1 * | 10/2009 | Du | H04W 48/02 455/436 |
| 2010/0234037 A1 * | 9/2010 | Terry | H04L 1/0023 455/450 |
| 2011/0158089 A1 * | 6/2011 | Sambhwani | H04W 36/22 370/230 |
| 2012/0282931 A1 * | 11/2012 | Giustina | H04W 36/22 455/437 |
| 2013/0028081 A1 * | 1/2013 | Yang | H04W 48/20 370/230 |
| 2013/0337814 A1 * | 12/2013 | Wong | H04W 48/20 455/438 |
| 2014/0004862 A1 * | 1/2014 | Ekemark | H04W 72/06 455/443 |
| 2014/0044105 A1 * | 2/2014 | Bontu | H04L 5/001 370/336 |

(Continued)

*Primary Examiner* — Jamal Javaid
*Assistant Examiner* — Kyaw Z Soe

(57) ABSTRACT

A system may be configured to receive analytics information regarding a cell of a wireless telecommunications network. The cell may be associated with multiple carriers, which may each be associated with, for example, a particular radio access technology ("RAT"), frequency band, or frequency sub-band. The system may dynamically rank the carriers based on measures of load associated with the carriers (as indicated by the analytics information), and may generate system information blocks ("SIBs") that include the dynamic rankings. The SIBs may be provided to user devices, which may select carriers, via which to connect to the cell, based on the dynamic rankings.

21 Claims, 5 Drawing Sheets

(56) References Cited

U.S. PATENT DOCUMENTS

| | | | |
|---|---|---|---|
| 2014/0066077 A1* | 3/2014 | Brisebois | H04W 16/08 455/445 |
| 2014/0213277 A1* | 7/2014 | Jang | H04W 28/08 455/453 |
| 2015/0208280 A1* | 7/2015 | Lorca Hernando | H04W 16/08 370/235 |
| 2016/0073312 A1* | 3/2016 | Sridhar | H04W 48/16 370/235 |

* cited by examiner

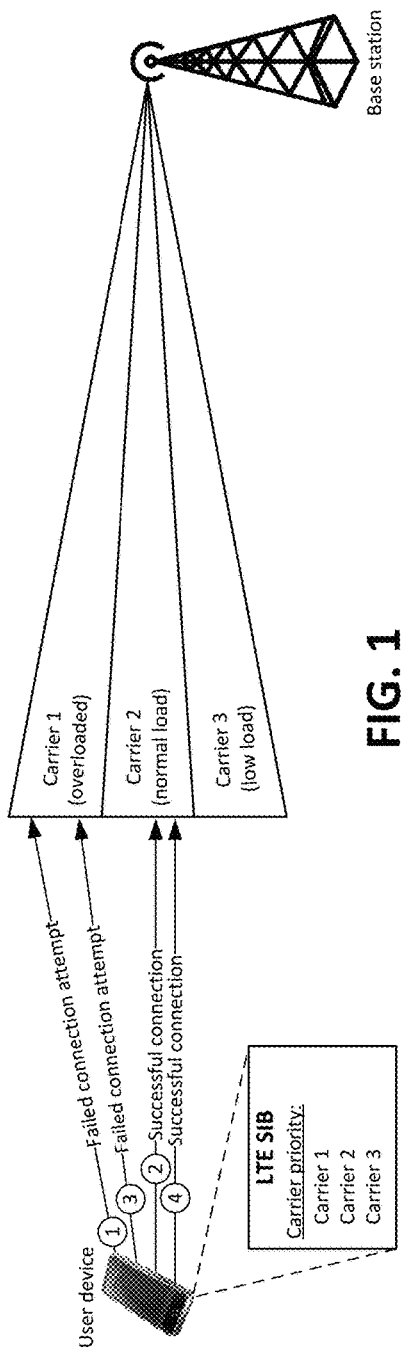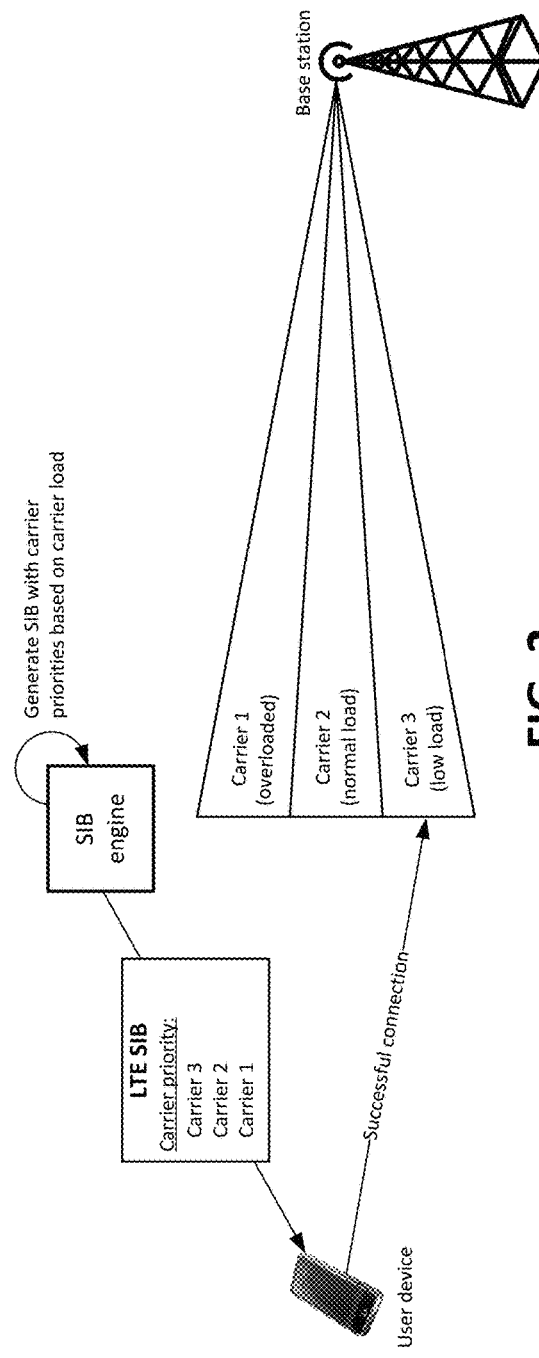

DYNAMIC CARRIER LOAD BALANCING

BACKGROUND

User devices, such as wireless telephones, associated with a Long Term Evolution ("LTE") network, may wirelessly connect, or "attach," to the network via a base station. The base station may provide multiple carriers, to which the user devices may attach. As used herein, a particular "carrier" may refer to a particular radio access technology ("RAT"), a particular frequency band, and/or a particular set of frequencies within a frequency band. A user device may attempt to connect to, or synchronize with, the network on a periodic or intermittent basis (e.g., upon an initial connection attempt, when the user device is handed over from one cell to another, when the user device is unable to connect to the network, etc.). One cell may be associated with multiple carriers. For example, in a particular coverage area, a base station may offer multiple RATs (e.g., a Third Generation Partnership Project ("3GPP") third generation ("3G") RAT, a 3GPP fourth generation ("4G") RAT, etc.), multiple frequency bands (e.g., a 700 MHz frequency band, a 1700 MHz frequency band, etc.), and/or multiple intra-frequency sub-bands (e.g., an "upper" 700 MHz sub-band, a "lower" 700 MHz sub-band, etc.).

When the user device attempts to connect to the network, the network may provide a system information block ("SIB") to the user device. The SIB may include a priority list of carriers. The user device may attempt to connect to the carrier that is highest in the priority list. If the highest priority carrier is unavailable (e.g., if the carrier is unreachable and/or does not accept the user device, such as when the carrier is overloaded), the user device may attempt to connect to the next carrier in the list, and so on.

BRIEF DESCRIPTION OF THE DRAWINGS

FIG. 1 illustrates an example situation in which a static priority list, in a SIB, may be problematic;

FIG. 2 illustrates an example overview of one or more implementations described herein, in which SIBs may be dynamically generated based on cell conditions;

DETAILED DESCRIPTION OF PREFERRED EMBODIMENTS

Figure 3:
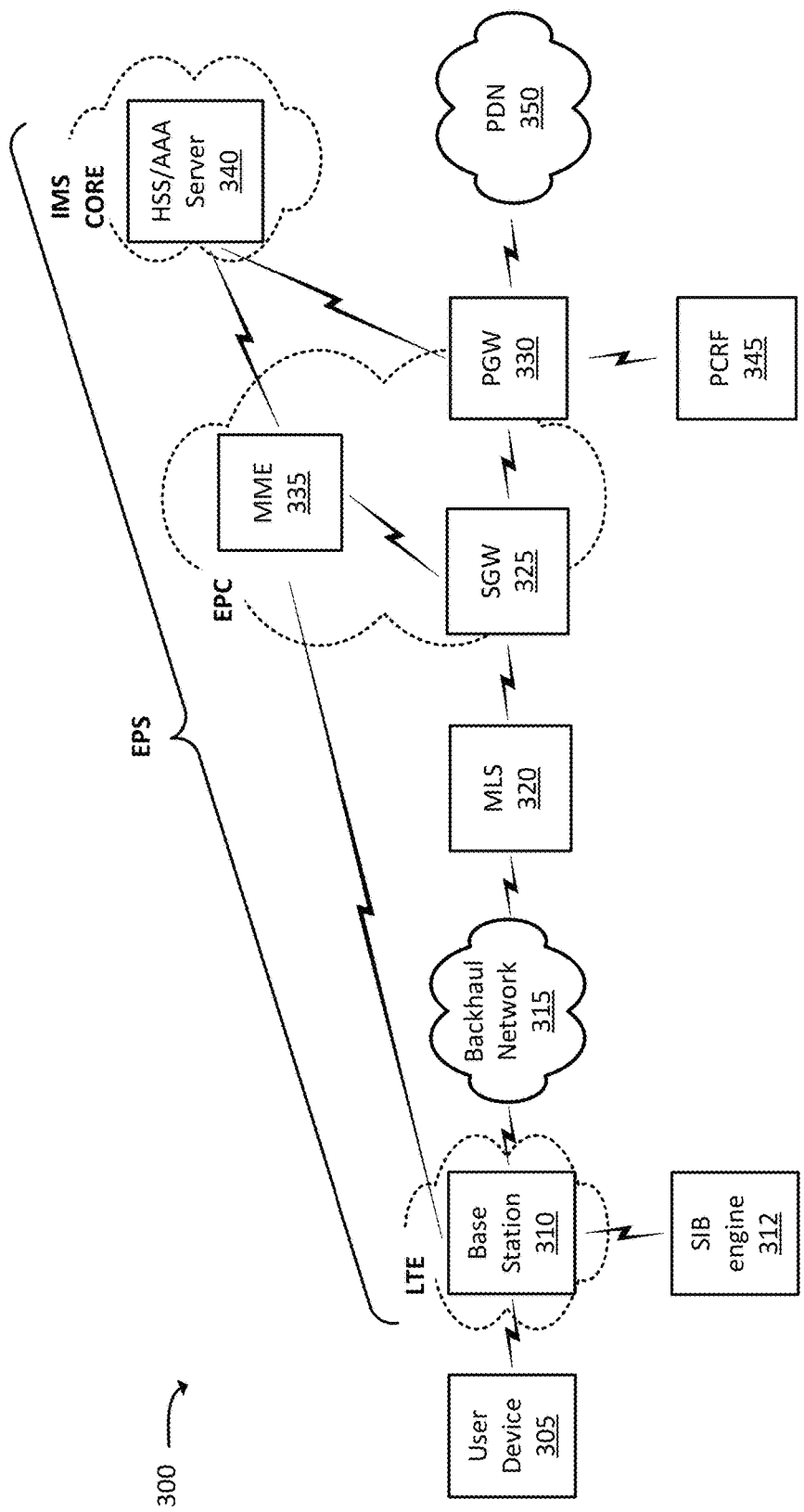
FIG. 3 illustrates an example environment, in which systems and/or methods, described herein, may be implemented.

The following detailed description refers to the accompanying drawings. The same reference numbers in different drawings may identify the same or similar elements.

As provided herein, some implementations may allow for the dynamic prioritizing of carriers, associated with a cell of a wireless telecommunications network, based on analytics information associated with the cell. The dynamic prioritization may be implemented by sending SIBs, that include the dynamically determined priorities, to user devices that are connecting to, or are attempting to connect to, the cell. As mentioned above, the term "carrier," as used herein, may refer to a particular RAT (e.g., 3G, 4G, etc.), a particular frequency band (e.g., a 700 MHz frequency band, a 1700 MHz frequency band, etc.), and/or a particular set of frequencies within a frequency band (e.g., an "upper" 700 MHz sub-band, a "lower" 700 MHz sub-band, etc.).

FIG. 1 illustrates an example situation in which it may be desirable to provide dynamically generated carrier priorities. As shown, a base station may be associated with multiple carriers ("Carrier 1," "Carrier 2," and "Carrier 3"). Carrier 1 may be overloaded (e.g., a large quantity of user devices may be connected to the base station via Carrier 1), Carrier 2 may have a "normal" load (e.g., a quantity of user devices connected to the base station via Carrier 2 may be within a "normal" range), and Carrier 3 may be have a "low" measure of load (e.g., a quantity of user devices connected to the base station via Carrier 3 may be below a range considered "normal"). As also shown, the user device may have received a SIB ("LTE SIB") that includes a prioritized list of carriers associated with the base station. The SIB may indicate that Carrier 1 is the highest priority carrier, then Carrier 2, and that Carrier 3 is the lowest priority carrier.

Based on the SIB, the user device may attempt (at arrow 1) to connect via Carrier 1. As shown in FIG. 1, the connection attempt may fail. For instance, the connection attempt may fail because Carrier 1 is overloaded (and, thus, the base station may deny the connection request), because of poor radio frequency ("RF") conditions between the user device and Carrier 1 (e.g., the base station may not receive the connection request), and/or for other reasons. Since Carrier 2 is indicated, in the SIB, as the next carrier in the priority list, the user device may attempt (at arrow 2) to connect via Carrier 2. As shown, the connection attempt may be successful.

At a later time, the user device may attempt to reattach to the base station. For example, the user device may attempt to reattach after a period of time has elapsed since the user device initially connected to the base station, when initiating a new traffic session, etc. The user device may once again attempt (at arrow 3) to attempt to Carrier 1, which is indicated in the SIB as being the highest priority carrier. As shown, this connection attempt may also fail, either for the same reasons or different reasons as the previous connection attempt (at arrow 1). Based on the failed connection attempt (at arrow 3), the user device may connect (at arrow 4) via Carrier 2.

In the example shown in FIG. 1, unnecessary resources and time may be expended in attempting via Carrier 1, since it is unlikely that a connection via Carrier 1 would be established (e.g., based on Carrier 1 being overloaded), thus potentially resulting in reduced performance and/or increased battery usage of the user device. Further, network resources may be more efficiently load balanced by utilizing Carrier 3 (which experiences a "low" level of load, in this example). However, based on the SIB, Carrier 3 may not be prioritized, so the user device may not attempt to connect to Carrier 3, even though it may be desirable for the user device to connect to Carrier 3.

FIG. 2 illustrates an example implementation in which SIBs may be dynamically generated based on carrier analytics information. As shown, a SIB engine may generate a SIB based on carrier load. For instance, the SIB may include a priority list that prioritizes the carriers in the following order: Carrier 3, Carrier 2, and Carrier 1. Based on the SIB, the user device may successfully connect via Carrier 3, without first attempting to connect via Carrier 1 and/or Carrier 2. Thus, time and/or network resources may be saved as compared to implementations in which the user device first attempts to connect via Carrier 1 and/or Carrier 2. Further, the usage of Carrier 3, as opposed to more loaded Carriers 1 and 2, may be beneficial for network performance. Furthermore, since the SIB itself is being dynamically generated, logic of the user device need not be changed, in order to implement techniques described herein.

FIG. 3 illustrates example environment 300, respectively, in which systems and/or methods described herein may be implemented. As shown in FIG. 3, environment 300 may include user device 305, base station 310, SIB engine 312, backhaul network 315, multi-layer switch ("MLS") 320, serving gateway ("SGW") 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), policy and charging rules function ("PCRF") 345, and PDN 350.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an evolved node B ("eNB"), via which user device 305 may communicate with the EPC network. The EPC network may include one or more SGWs 325, PGWs 330, and/or MMEs 335, and may enable user device 305 to communicate with PDN 350 and/or an Internet protocol ("IP") multimedia subsystem ("IMS") core network. The IMS core network may include HSS/AAA server 340, and may manage authentication, session initiation, account information, a user profile, etc., associated with user device 305.

User device 305 may include any computation and communication device, such as a wireless mobile communication device that is capable of communicating with base station 310 and/or PDN 350. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from PDN 350 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to user device 305 via SGW 325, PGW 330, and/or PDN 350. Base station 310 may send traffic to and/or receive traffic from user device 305 via, for example, an air interface (e.g., a cellular air interface).

Base station 310 may be associated with one or more cells. A "cell," as used to herein, may generally refer to a coverage area provided by base station 310. A particular cell may, for example, be associated with one or more radios pointed in the same general direction. The different radios may each be associated with a particular carrier, or more than one radio may be associated with a particular carrier. For example, one or more radios may be associated with a 3G carrier, while one or more other radios of the cell may be associated with a 4G carrier. As another example, one set of radios, of the cell, may be associated with a 700 MHz band, while another set of radios may be associated with a 1700 MHz band. As yet another example, one set of radios may be associated with one sub-band of a particular wireless band, while another set of radios may be associated with a different sub-band, of the particular wireless band.

SIB engine 312 may include one or more network devices that dynamically generate SIBs, in accordance with implementations described herein. SIB engine 312 may be deployed on a per-base station basis (e.g., one SIB engine 312 per base station 310), on a per-cell basis (e.g., one SIB engine 312 per cell, associated with a particular base station 310), or on another basis (e.g., one SIB engine 312 for multiple cells, or one SIB engine 312 for multiple base stations 310). In some implementations, some functionality of SIB engine 312 may be deployed more granularly than other functionality of SIB engine 312. For example, as described below, SIB engine 312 may generate SIBs on a per-cell basis, and may receive and store information regarding more than one cell. That is, SIB engine 312 may generate SIBs, for a particular cell, based on analytics information regarding the particular cell and/or one or more other cells (e.g., neighboring cells).

Backhaul network 315 may include one or more network devices (e.g., routers and/or switches) and links (e.g., fiber or coaxial links), that connect base station 310 to a core network (e.g., a core network that includes and/or is associated with MLS 320, SGW 325, and/or PGW 330).

MLS 320 may include one or more network devices that perform switching functionality on traffic received from SGW 325 and/or backhaul network 315. MLS 320 may operate multiple layers of the Open Systems Interconnection ("OSI") reference model, in contrast with other types of switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to PDN 350 via PGW 330.

PGW 330 may include one or more network devices that gather, process, search, store, and/or provide information in a manner described herein. PGW 330 may aggregate traffic received from one or more SGWs 325, etc. and may send the aggregated traffic to PDN 350. PGW 330 may also, or alternatively, receive traffic from PDN 350 and may send the traffic toward user device 305 via base station 310, and/or SGW 325.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 305); information regarding services to which particular subscribers are subscribed (e.g., communication services, such as video conferencing services, voice chat services, etc.); and/or other information. Additionally, or alternatively, HSS/AAA server 340 may perform authentication, authorization, and/or accounting operations associated with the subscriber and/or a communication session with user device 305.

PCRF 345 may include one or more devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

PDN 350 may include one or more wired and/or wireless networks. For example, PDN 350 may include an Internet Protocol ("IP")-based PDN, a wide area network ("WAN") such as the Internet, a core network of a telecommunications provider, a private enterprise network, and/or one or more other networks. User device 305 may connect, through PGW 330, to data servers, application servers, other user devices 305, content provider 275, and/or to other servers or applications that are coupled to PDN 350. PDN 350 may be connected to one or more other networks, such as a public switched telephone network ("PSTN"), a public land mobile network ("PLMN"), and/or another network.

Figure 4:
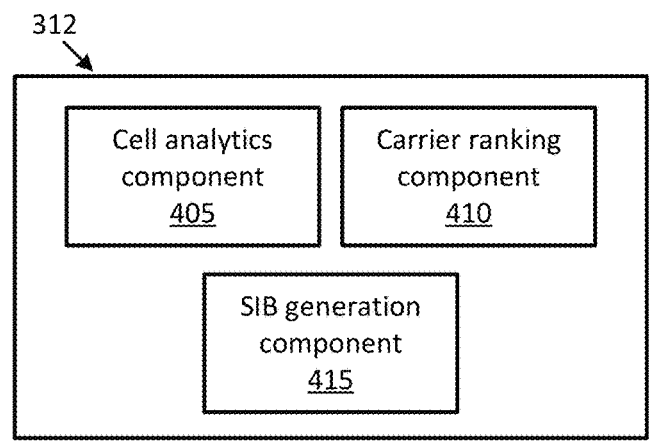
FIG. 4 illustrates example functional components of a SIB engine, in accordance with one or more implementations.

FIG. 4 illustrates example functional components of SIB engine 312, in accordance with some implementations. As shown, SIB engine 312 may include cell analytics component 405, carrier ranking component 410, and SIB generation component 415. In other implementations, the SIB engine 312 may include additional, fewer, different, and/or differently arranged modules. Further, the functionality of one module may be performed by one or more other modules. Also, the functionality of multiple modules may be performed by one module.

Cell analytics component 405 may receive and/or store analytics information regarding one or more cells associated with base station 310. For example, the cell analytics information may indicate how loaded the cells are, and may be on a per-carrier basis. For example, for a particular cell, the cell analytics information may indicate how loaded each carrier, associated with the particular cell, is. For instance, a particular carrier may be loaded when a relatively large quantity of user devices 305 are connected to base station 310 via the carrier. As another example, a measure of load may indicate how many resource blocks, associated with a particular carrier have been utilized, and/or how many resource blocks are available. Cell analytics component 405 may receive analytics information regarding one cell (e.g., carriers associated with one cell) or more than one cell (e.g., carriers associated with two or more cells). Cell analytics component 405 may receive the analytics information from base station 310 and/or from another device (e.g., a device that communicates with one or more base stations 310 in order to determine the analytics information).

The cell analytics information may be real time, or near-real time information. For example, cell analytics component 405 may receive up-to-date analytics information, as the information is collected or generated. In some implementations, the cell analytics information may include historical information (e.g., cell analytics information from the past hour, from the past day, from the past month, etc.). In some implementations, cell analytics component 405 may maintain the information along with timestamp information, which may be used by, for example, carrier ranking component 410. For example, carrier ranking component 410 may rank carriers based on the cell analytics information from the past hour, from the past day, etc. As another example, carrier ranking component 410 may rank carriers based on time of day, day of week, season of the year, etc.

Carrier ranking component 410 may rank carriers, of a particular cell, based on the cell analytics information for the particular cell (e.g., information received and/or stored by cell analytics component 405). For instance, a carrier that is relatively highly loaded may be ranked lower than a carrier that is less loaded. In this manner, less loaded carriers may be prioritized over more loaded carriers, so that user devices 305 attempt to connect via the less loaded carriers before attempting to connect via the more loaded carriers. In some implementations, carrier ranking component 410 may rank carriers based on one or more other factors. For example, a particular carrier may be weighted more heavily than another one, so that even if the particular carrier is more heavily loaded than the other carrier, the particular carrier may be ranked higher than the other carrier.

For example, a network administrator may weight a 4G carrier more heavily than a 3G carrier. If the 4G carrier is not significantly (e.g., at least a threshold) more loaded than the 3G carrier, carrier ranking component 410 may not rank the 3G carrier ahead of the 4G carrier. On the other hand, if the 4G carrier is significantly more loaded than the 3G carrier, carrier ranking component 410 may rank the 3G carrier ahead of the 4G carrier. As another example, a network administrator may weight a better performing carrier over a worse performing carrier (e.g., the better performing carrier may provide for higher bandwidth communications, lower latency communications, larger coverage area, stronger coverage (e.g., higher signal-to-noise ratio), etc.).

As yet another example, a SIB may include multiple profiles, which may be used by different user devices 305. For example, different profiles may be associated with different applications (e.g., voice call applications, video conferencing applications, messaging applications, web browsing applications, file transfer applications, etc.). Carrier ranking component 410 may weight carriers differently, for each profile. For example, a particular carrier may be weighted more heavily for a first profile that is associated with voice call applications than for a second profile that is associated with file transfer applications. User devices 305 may connect to carriers in a manner that is based on a SIB associated with a current application being used by user device 305. For example, if user device 305 is carrying on a voice call, user device 305 may connect to a highest ranked carrier, according to a SIB profile that is associated with voice calls.

As another example, carrier ranking component 410 may rank the carriers based on a previous rank of the carriers. For example, if a particular carrier was ranked ahead of another carrier (e.g., based on manual settings provided by an administrator, and/or as dynamically determined by carrier ranking component 410 or another device), the prior ranking may be used as a factor in ranking the carriers. For instance, if the particular carrier is not significantly (e.g., at least a threshold) more loaded than the other carrier, carrier ranking component 410 may determine that the particular carrier should maintain its ranking ahead of the other carrier.

As yet another example, carrier ranking component 410 may rank the carriers based on average length (or median length, or another measure of length) of connections via the carriers. The "length" of a connection may refer to how long a particular user device 305 is connected via a particular carrier. For example, if a particular carrier experiences longer connections than another carrier, carrier ranking component 410 may rank the particular carrier lower than the other carrier. In other implementations (e.g., if configured by an administrator to do so), carrier ranking component 410 may rank the particular carrier higher than the other carrier that experiences shorter connections.

In some implementations, carrier ranking component 410 may rank the carriers based on analytics information based on one or more other cells (e.g., another cell associated with the same base station 310 and/or another base station 310). For example, a particular cell may have the same carriers or similar carriers as another cell (such as a neighboring, or adjacent, cell). Carrier ranking component 410 may use the analytics information, regarding the same or similar carrier of another cell, when ranking a particular carrier of a particular cell.

Carrier ranking component 410 may rank the carriers, of a particular cell, on a periodic or intermittent basis. For example, carrier ranking component 410 may rank the carriers every 20 seconds, every minute, every hour, and/or at another regular interval. As another example, carrier ranking component 410 may rank the carriers upon the occurrence of a particular event, such as when a particular carrier becomes loaded, when a particular carrier reaches a threshold amount of load, when a request for a SIB is received, and/or another event.

Carrier ranking component 410 may rank the carriers based on one or more of the above example criteria (including any combination of the above example criteria) and/or based on one or more other criteria not explicitly mentioned above. As also mentioned above, carrier ranking component 410 may rank carriers based on other factors, such as time of day, day of week, season, etc. For example, in some implementations, carrier ranking component 410 may assign different weights to different carriers based on the time of day, day of week, etc.

SIB generation component 415 may generate SIBs based on the ranking performed by carrier ranking component 410. The SIBs may, for example, be generated according to a 3GPP LTE standard, or in a different manner. In some implementations, SIB generation component 415 may generate a new SIB each time a new ranking is performed by carrier ranking component 410. In other implementations, SIB generation component 415 may generate a SIB at other times. SIB generation component 415 may provide the generated SIBs to base station 310, which may output the SIBs to one or more user devices 305.

As mentioned above, in some implementations, SIB engine 312 may be associated with multiple cells. In some such implementations, SIB engine 312 may include multiple instances of certain components described below. For instance, assume that SIB engine 312 is associated with three cells. In this example, SIB engine 312 may include one cell analytics component 405, multiple (e.g., three) carrier ranking components 410, and multiple (e.g., three) SIB generation components 415.

Figure 5:
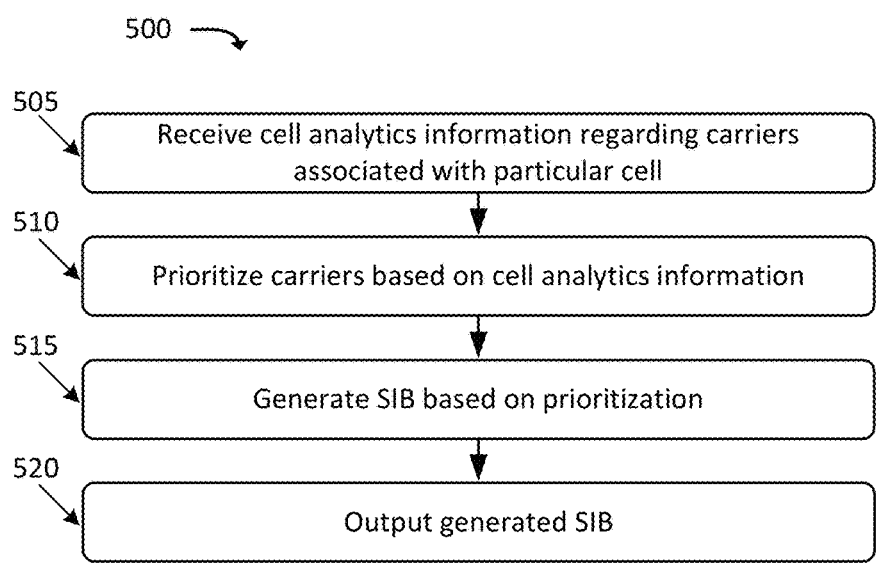
FIG. 5 illustrates an example process for generating a SIB based on cell analytics information.

FIG. 5 illustrates an example process 500 for generating a SIB based on analytics information associated with a cell. In some implementations, process 500 may be performed by SIB engine 312. In other implementations, some or all of process 500 may be performed by one or more other devices.

Process 500 may include receiving (at 505) cell analytics information regarding carriers associated with a particular cell. For example, as described above with respect to cell analytics component 405, SIB engine 312 may receive cell analytics information, which may indicate, for example, load associated with carriers of a particular cell. The analytics information may additionally, or alternatively, include other types of information, such as an average time of connections of user devices 305 via the carriers.

Process 500 may also include prioritizing (at 510) carriers based on the cell analytics information. For instance, as described above with respect to carrier ranking component 410, SIB engine 312 may rank the carriers based on the analytics information and/or one or more other factors, such as weights associated with the carriers, a previous ranking of the carriers, etc.

Process 500 may further include generating (at 515) a SIB based on the prioritization, and outputting (at 520) the SIB. For example, as described above with respect to SIB generation component 415, SIB engine 312 may generate a SIB, and may output the SIB to base station 310. The SIB may be provided to one or more user devices 305, and user devices 305 may use the SIB to determine which carriers to attempt to attach to, and in which order to make the attempts.

As mentioned above, some or all of process 500 may be repeated in an iterative manner. For example, SIB engine 312 may receive (at 505) cell analytics information on an ongoing basis, and may prioritize (at 510) carriers and dynamically generate (at 515) SIBs based on the cell analytics information that is received on an ongoing basis. Thus, at one particular time, the rankings in a particular SIB may be different from the rankings in another SIB generated at a subsequent time.

Figure 6:
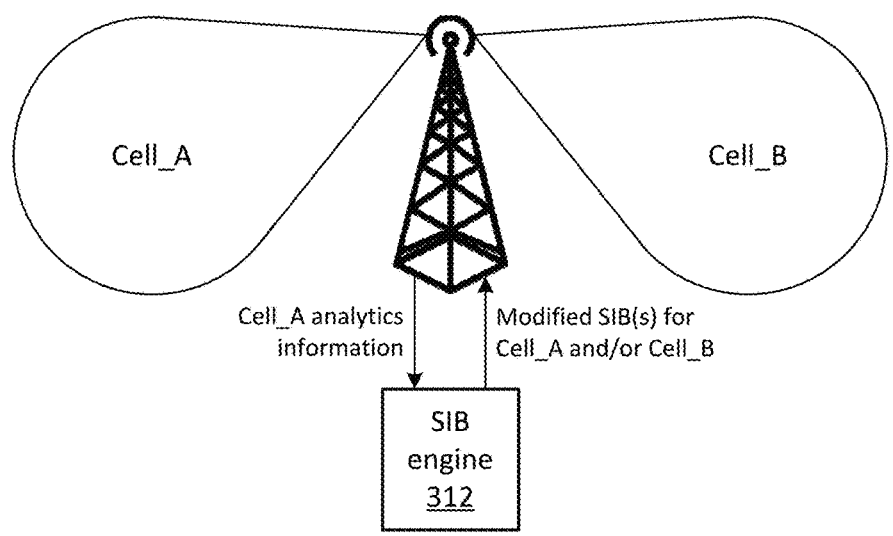
FIG. 6 conceptually illustrates an implementation in which analytics information, regarding one cell, may be used to generate a SIB for another cell.

FIG. 6 conceptually illustrates an example implementation, in which cell analytics information for one cell is used to rank carriers of another cell. As shown, a base station may be associated with two cells, "Cell_A" and "Cell_B." SIB engine 312 may receive analytics information regarding Cell_A, and may use the analytics information to generate SIBs for Cell_A and/or for Cell_B.

Figure 7:
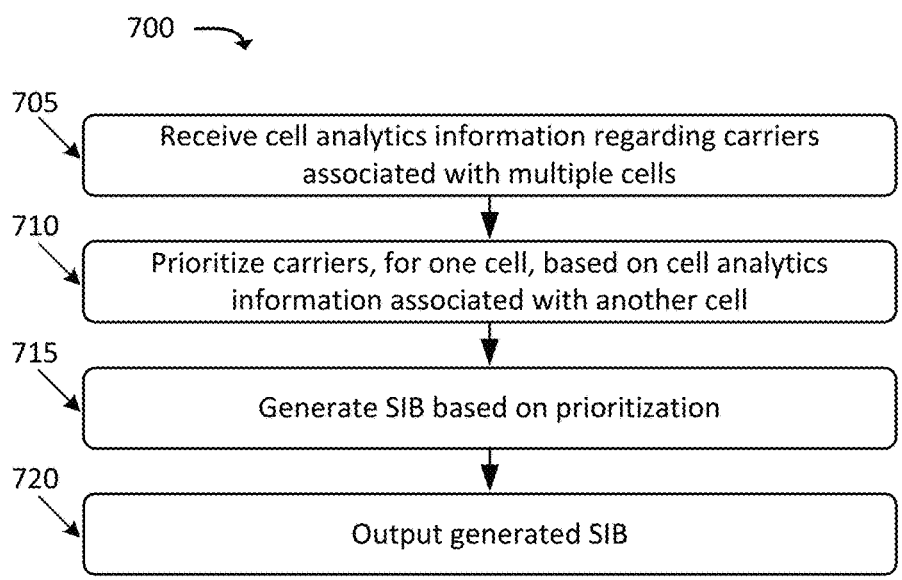
FIG. 7 illustrates an example process for using analytics information, regarding one cell, to generate a SIB for another cell.

FIG. 7 illustrates an example process 700 for generating a SIB, for a particular cell, based on analytics information associated with another cell. In some implementations, process 700 may be performed by SIB engine 312. In other implementations, some or all of process 700 may be performed by one or more other devices.

Process 700 may include receiving (at 705) cell analytics information regarding carriers associated with multiple cells. For example, as described above with respect to cell analytics component 405, SIB engine 312 may receive cell analytics information, which may indicate, for example, load associated with carriers of one or more cells. The analytics information may additionally, or alternatively, include other types of information, such as an average time of connections of user devices 305 via the carriers.

Process 700 may also include prioritizing (at 710) carriers, of one cell, based on cell analytics information associated with another cell. For instance, as described above with respect to carrier ranking component 410, SIB engine 312 may rank the carriers, of one cell, based on the analytics information associated with another cell. SIB engine 312 may rank the carriers of the cell based on one or more other factors, such as analytics information associated with the particular cell, weights associated with the carriers, a previous ranking of the carriers, etc.

Process 700 may further include generating (at 715) a SIB based on the prioritization, and outputting (at 720) the SIB. For example, as described above with respect to SIB generation component 415, SIB engine 312 may generate a SIB, and may output the SIB to base station 310. The SIB may be provided to one or more user devices 305, and user devices 305 may use the SIB to determine which carriers to attempt to attach to, and in which order to make the attempts.

As mentioned above, some or all of process 700 may be repeated in an iterative manner. For example, SIB engine 312 may receive (at 705) cell analytics information on an ongoing basis, and may prioritize (at 710) carriers and dynamically generate (at 715) SIBs based on the cell analytics information that is received on an ongoing basis. Thus, at one particular time, the rankings in a particular SIB may be different from the rankings in another SIB generated at a subsequent time.

Figure 8:
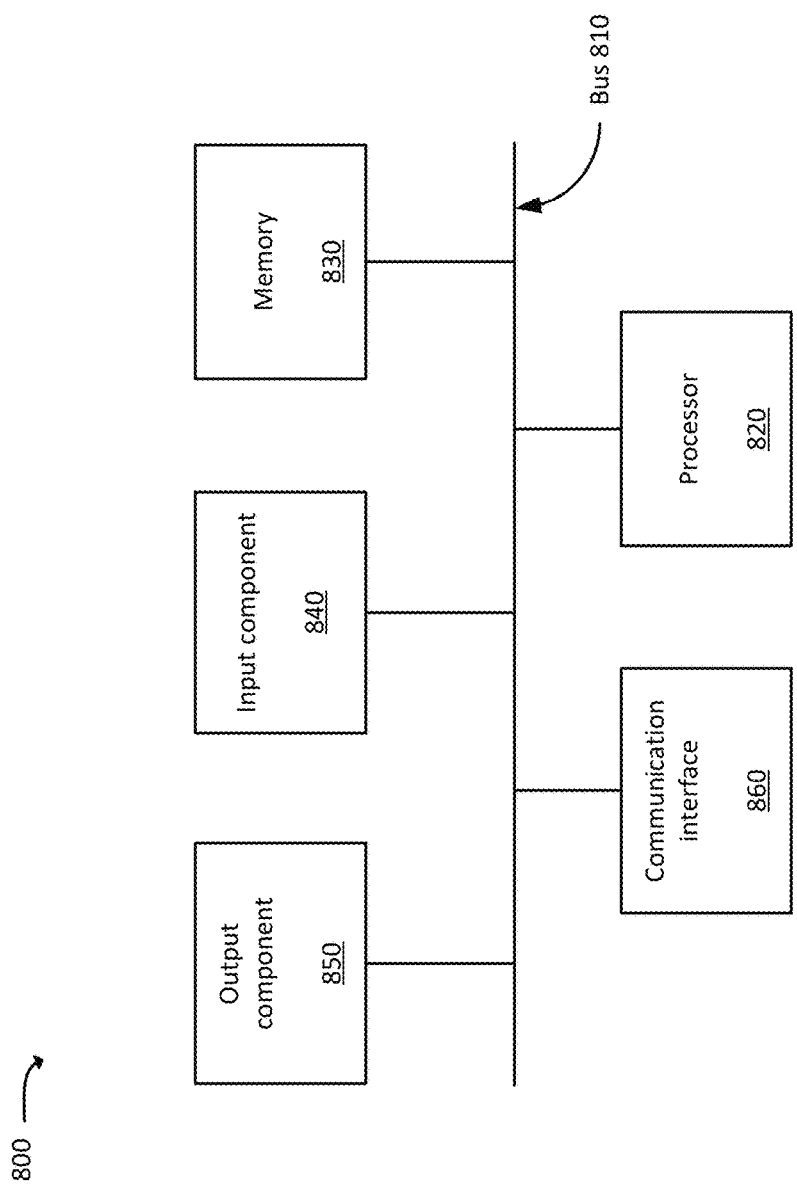
FIG. 8 illustrates example components of a device, in accordance with some implementations described herein.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 5 and 7, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by one or more devices, first analytics information associated with a particular cell of a wireless telecommunications network,
        the first analytics information indicating measures of load of a plurality of carriers associated with the particular cell;
    ranking, by the one or more devices, the plurality of carriers based on the first analytics information;
    generating, by the one or more devices, a first system information block ("SIB") that includes a first ordered list of the plurality of carriers, the first ordered list being in an order based on the ranking;
    outputting, by the one or more devices, the generated first SIB to a user device,
        wherein the user device attempts to connect to the particular cell via a particular carrier, of the plurality of carriers, in a manner that is based on the first ordered list included in the first SIB;
    receiving, after outputting the first SIB to the user device, second analytics information indicating measures of load of the plurality of carriers associated with the particular cell;
    re-ranking the plurality of carriers based on the second analytics information; and
        generating a second SIB that includes a second ordered list of the plurality of carriers, the second ordered list being in an order based on the re-ranking.

2. The method of claim 1, wherein a measure of load, regarding a first carrier, of the plurality of carriers, is based on at least one of:
    a quantity of user devices connected to the cell via the first carrier,
    a quantity of resource blocks, associated with the first carrier, that are in use, or
    a quantity of resource blocks, associated with the first carrier, that are available.

3. The method of claim 1, wherein each carrier, of the plurality of carriers, is associated with a particular set of radio transceivers.

4. The method of claim 1, wherein a first carrier, of the plurality of carriers, is associated with a first radio access technology ("RAT"), and
    wherein a second carrier, of the plurality of carriers, is associated with a second RAT that is different than the first RAT.

5. The method of claim 1, wherein a first carrier, of the plurality of carriers, is associated with a first wireless frequency band, and
    wherein a second carrier, of the plurality of carriers, is associated with a second wireless frequency band that is different than the first wireless frequency band.

6. The method of claim 1, wherein receiving the first analytics information includes iteratively receiving the first analytics information on an ongoing basis,
    wherein the second ordered list is in a different order than the first ordered list included in the first SIB.

7. The method of claim 1, wherein the ranking is further based on weights associated with one or more carriers, of the plurality of carriers.

8. The method of claim 7, wherein the weight, associated with a first carrier, of the one or more carriers, is based on a measure of performance associated with the first carrier.

9. A computing device, comprising:
    a memory device storing a set of processor-executable instructions; and
    a processor configured to execute the processor-executable instructions, wherein executing the processor-executable instructions causes the processor to:
        receive first analytics information associated with a particular cell of a wireless telecommunications network,
            the first analytics information indicating measures of load of a plurality of carriers associated with the particular cell;
        rank the plurality of carriers based on the first analytics information;
        generate a first system information block ("SIB") that includes a first ordered list of the plurality of carriers, the first ordered list being in an order based on the ranking;
        output the generated first SIB to a user device,
            wherein the user device attempts to connect to the particular cell via a particular carrier, of the plurality of carriers, in a manner that is based on the first ordered list included in the first SIB;
        receive, after outputting the first SIB to the user device, second analytics information indicating measures of load of the plurality of carriers associated with the particular cell;
        re-rank the plurality of carriers based on the second analytics information; and
        generate a second SIB that includes a second ordered list of the plurality of carriers, the second ordered list being in an order based on the re-ranking.

10. The computing device of claim 9, wherein a measure of load, regarding a first carrier, of the plurality of carriers, is based on at least one of:
    a quantity of user devices connected to the cell via the first carrier,
    a quantity of resource blocks, associated with the first carrier, that are in use, or
    a quantity of resource blocks, associated with the first carrier, that are available.

11. The computing device of claim 9, wherein each carrier, of the plurality of carriers, is associated with a particular set of radio transceivers.

12. The computing device of claim 9, wherein a first carrier, of the plurality of carriers, is associated with a first radio access technology ("RAT"), and
wherein a second carrier, of the plurality of carriers, is associated with a second RAT that is different than the first RAT.

13. The computing device of claim 9, wherein a first carrier, of the plurality of carriers, is associated with a first wireless frequency band, and
wherein a second carrier, of the plurality of carriers, is associated with a second wireless frequency band that is different than the first wireless frequency band.

14. The computing device of claim 9, wherein a first carrier, of the plurality of carriers, is associated with a first sub-band of a particular wireless frequency band, and
wherein a second carrier, of the plurality of carriers, is associated with a second sub-band of the particular wireless frequency band, the second sub-band being different than the first sub-band.

15. The computing device of claim 9, wherein the ranking is further based on weights associated with one or more carriers, of the plurality of carriers.

16. The computing device of claim 7, wherein the weight, associated with a first carrier, of the one or more carriers, is based on a measure of performance associated with the first carrier.

17. A non-transitory computer-readable medium, storing:
a plurality of processor-executable instructions, which, when executed, cause a processor to:
receive first analytics information associated with a particular cell of a wireless telecommunications network,
the first analytics information indicating measures of load of a plurality of carriers associated with the particular cell;
generate a first ranking of the plurality of carriers based on:
the first analytics information, and
a first set of weights;
generate a second ranking of the plurality of carriers based on:
the first analytics information, and
a second set of weights;
generate a first system information block ("SIB") that includes at least a first profile and a second profile,
the first profile including a first ordered list of the plurality of carriers, the first ordered list being in an order based on the first ranking, and
the second profile including a second ordered list of the plurality of carriers, the second ordered list being in an order based on the second ranking;
output the generated first SIB to a user device,
wherein the user device selects a particular profile, of the plurality of profiles, based on a type of application implemented via the wireless telecommunications network, and wherein the user device attempts to connect to the particular cell via a particular carrier, of the plurality of carriers, based on the ordered list included in the selected particular profile;
receive, after outputting the first SIB to the user device, second analytics information indicating measures of load of the plurality of carriers associated with the particular cell;
re-rank the plurality of carriers based on the second analytics information; and
generate a second SIB that includes a third ordered list of the plurality of carriers, the third ordered list being in an order based on the re-ranking.

18. The non-transitory computer-readable medium of claim 17, wherein a measure of load, regarding a first carrier, of the plurality of carriers, is based on at least one of:
a quantity of user devices connected to the cell via the first carrier,
a quantity of resource blocks, associated with the first carrier, that are in use, or
a quantity of resource blocks, associated with the first carrier, that are available.

19. The non-transitory computer-readable medium of claim 17, wherein a first carrier, of the plurality of carriers, is associated with a first radio access technology ("RAT"), and
wherein a second carrier, of the plurality of carriers, is associated with a second RAT that is different than the first RAT.

20. The non-transitory computer-readable medium of claim 18, wherein a first carrier, of the plurality of carriers, is associated with a first wireless frequency band, and
wherein a second carrier, of the plurality of carriers, is associated with a second wireless frequency band that is different than the first wireless frequency band.

21. The method of claim 1, further comprising:
outputting the second SIB to the user device,
wherein the user device attempts to connect to the particular cell via a second carrier, of the plurality of carriers, in a manner that is based on the second ordered list included in the SIB.

* * * * *